12) United States Patent
Enomoto et al.

(10) Patent No.: US 7,431,639 B2
(45) Date of Patent: Oct. 7, 2008

(54) VEHICLE AIR-CONDITIONING UNIT, ASSEMBLY STRUCTURE OF VEHICLE AIR-CONDITIONING UNIT AND LINK MODULE FOR USE THEREIN

(75) Inventors: Sho Enomoto, Utsunomiya (JP); Yoshinobu Tsuihiji, Tochigi (JP)

(73) Assignee: Calsonic Kansei Corporation (JP)

( * ) Notice: Subject to any disclaimer, the term of this patent is extended or adjusted under 35 U.S.C. 154(b) by 198 days.

(21) Appl. No.: 10/939,759

(22) Filed: Sep. 13, 2004

(65) Prior Publication Data

US 2005/0056397 A1 Mar. 17, 2005

(30) Foreign Application Priority Data

Sep. 17, 2003 (JP) ............................ P2003-324600
Sep. 17, 2003 (JP) ............................ P2003-324606

(51) Int. Cl.
B60H 1/34 (2006.01)

(52) U.S. Cl. .......................... 454/152; 454/121; 165/41

(58) Field of Classification Search ................. 454/121, 454/143, 152; 165/41, 42
See application file for complete search history.

(56) References Cited

U.S. PATENT DOCUMENTS

| 5,281,049 | A | * | 1/1994 | Holt ............................ 454/69 |
| 5,338,249 | A | * | 8/1994 | Hildebrand et al. .......... 454/126 |
| 5,921,527 | A | * | 7/1999 | Ikawa et al. ............. 251/129.03 |
| 5,924,332 | A | * | 7/1999 | Ozeki ........................ 74/502.4 |
| 6,416,404 | B2 | * | 7/2002 | Ozeki ......................... 454/156 |
| 6,702,008 | B1 | * | 3/2004 | Hibino et al. ............... 165/202 |
| 6,761,214 | B2 | * | 7/2004 | Kuribayashi et al. ......... 165/204 |

FOREIGN PATENT DOCUMENTS

JP 9-20128 1/1997

* cited by examiner

*Primary Examiner*—Derek S Boles
(74) *Attorney, Agent, or Firm*—Kilpatrick Stockton LLP

(57) ABSTRACT

A vehicle air-conditioning unit includes a plurality of doors for opening and closing an air passage within a unit case, and a link mechanism. The link mechanism has levers fixed to rotary shafts of the doors, respectively, to rotate with the rotary shafts of the doors, a base fixed to the unit case, and a main link rotatably or slidably supported on the base, being engaged with the levers for rotating the levers when driven by a driving means. The levers and the main link are disposed between the base and the unit case.

18 Claims, 10 Drawing Sheets

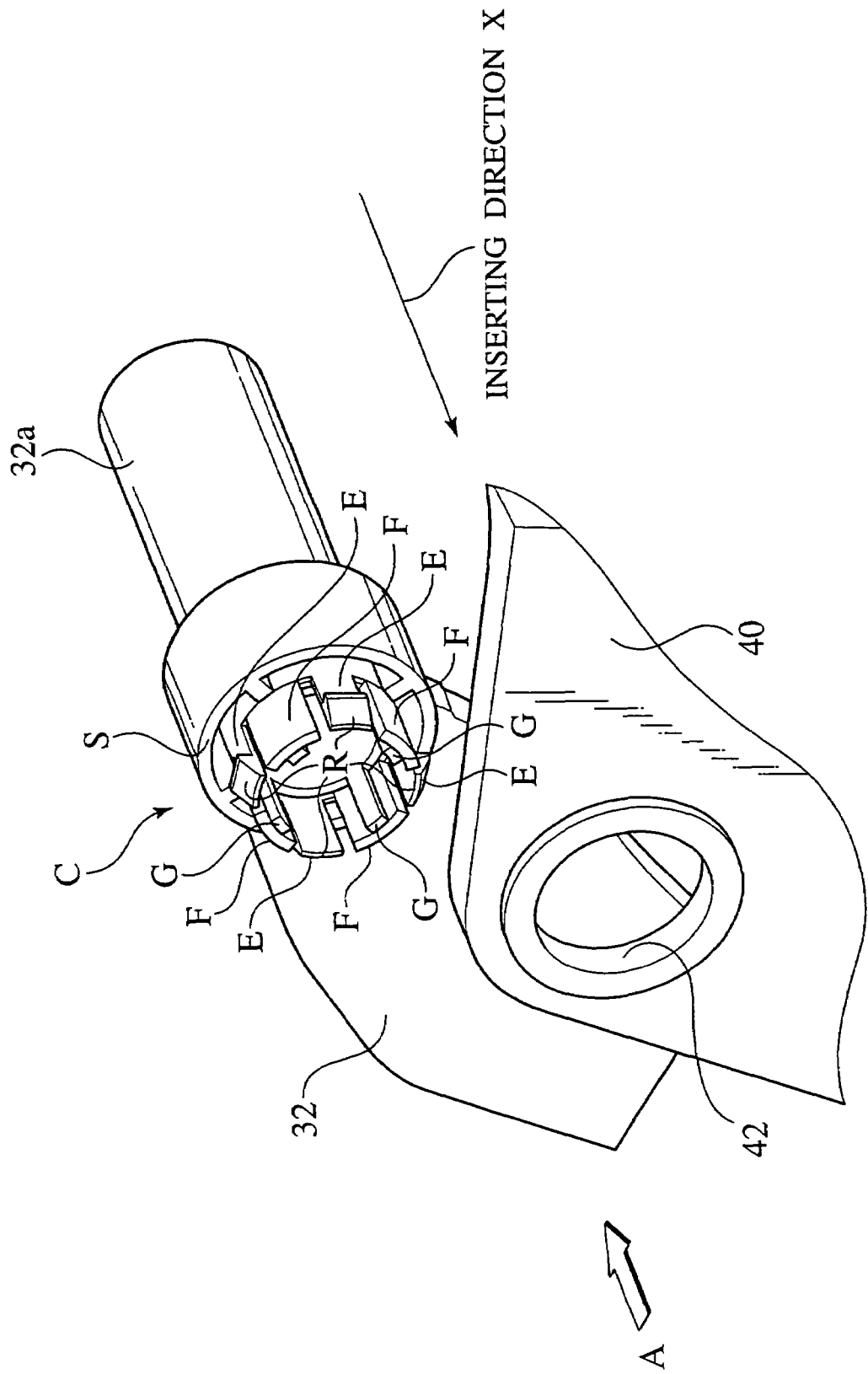

INSERTING DIRECTION X

VEHICLE AIR-CONDITIONING UNIT, ASSEMBLY STRUCTURE OF VEHICLE AIR-CONDITIONING UNIT AND LINK MODULE FOR USE THEREIN

CROSS REFERENCE TO RELATED APPLICATIONS

This application is based upon and claims the benefit of priority from the prior Japanese Patent Applications No. P2003-324600 filed on Sep. 17, 2003 and No. P2003-324606 filed on Sep. 17, 2003; the entire contents of which are incorporated herein by reference.

BACKGROUND OF THE INVENTION

1. Field of the Invention

The present invention relates to vehicle air-conditioning units mainly for use in automobiles.

2. Description of the Related Art

FIG. 10 is a side view of an exemplary conventional vehicle air-conditioning unit (Japanese Patent Application No. H09-020128) An air-conditioning unit 100a shown in the figure has a unit case 100b in which an air passage is formed. The unit case 100b is provided with a face outlet 100c, a defroster outlet 100d and a foot outlet 100e through which air flows out of the unit.

In order to control the amount of air flowing out through the face outlet 100c, the defroster outlet 100d and the foot outlet 100e, a first mode door 100f and a second mode door 100g are disposed in the air passage. In this air-conditioning unit, the proportions of air flowing out through the outlets are adjusted for each mode (e.g., a face mode, a foot mode, a bi-level mode and a defroster mode). For this, rotations of the mode doors 100f and 100g are interlinked by a link mechanism 110. The link mechanism 110 includes a first lever 111 fixed to a rotary shaft of the first mode door 100f, a second lever 112 fixed to a rotary shaft of the second mode door 100g, a main link 114, and an intermediate link 113. The main link 114 is driven (rotated in this example) by a driving force from a driving means to rotate the levers 111 and 112. The intermediate link 113 is interposed between the main link 114 and a given lever (the second lever 112 in this example) to rotate the given lever in a direction opposite to that of another lever (the first lever 111 in this example).

More specifically, the main link 114 is rotatably mounted to the unit case 100b, and has three arms which extending in three different directions from the pivot. A first arm is provided with an engaging pin 114n movably fitted in a cam groove 111m of the first lever 111. A second arm is provided with an engaging pin 114p movably fitted in a cam groove 113k of the intermediate link 113. A third arm is provided with a mounting hole 114q to which a driving cable is attached. The intermediate link 113 is rotatably mounted to the unit case 11b, and has two arms which extending in two different directions from the pivot. A first arm is provided with an engaging pin 113j movably fitted in a cam groove 112i of the second lever 112. A second arm is provided with the cam groove 113k in a given shape.

Since the components of the link mechanism 110 (the levers 111 and 112, the intermediate link 113 and the main link 114) are exposed outside of the unit case 100b, the components may be accidentally damaged during vehicle assembly.

In the structure of the air-conditioning unit 100a, the components are mounted to the unit case 100b one by one in predetermined order, resulting in a complicated mounting operation of the link mechanism 110 and increased production costs.

SUMMARY OF THE INVENTION

It is an object of the present invention to reduce the possibility of damage to a link mechanism.

It is another object of the present invention to increase the efficiency of mounting a link mechanism to a unit case.

According to a first aspect of the present invention, there is provided a vehicle air-conditioning unit comprising a plurality of doors for opening and closing an air passage within a unit case of the air-conditioning unit; and a link mechanism; the link mechanism comprises levers fixed to rotary shafts of the doors, respectively, to rotate with the rotary door shafts; a base fixed to the unit case; and a main link moveably supported on the base and engaged with the levers, for rotating the levers. The levers and the main link are disposed between the base and the unit case.

According to a second aspect of the present invention, there is provided an assembly structure of a vehicle air-conditioning unit comprising a plurality of doors for opening and closing an air passage within a unit case of the air-conditioning unit; and a link module; the link module comprises levers attached to rotary shafts of the doors, respectively, to rotate with the rotary door shafts; a base attached to the unit case; and a rotary link plate rotatably supported on the base to be rotated by a driving means, so as to rotate the levers. The levers, the rotary link plate and the base are assembled into the link module, and the link module is mounted to the unit case.

According to a third aspect of the present invention, there is provided a link module for interlocking a plurality of doors for opening and closing an air passage within a unit case of a vehicle air-conditioning unit, the link module comprising levers attached to rotary shafts of the doors, respectively, to rotate with the rotary shafts of the doors; a base attached to the unit case; and a rotary link plate rotatably supported on the base to be rotated by a driving means, so as to rotate the levers simultaneously. The levers, the rotary link plate and the base are assembled into the link module, and the link module can be mounted to the unit case.

BRIEF DESCRIPTION OF THE SEVERAL VIEWS OF THE DRAWINGS

FIG. 6 is an exploded perspective view at an angle different from that in FIG. 5;

DETAILED DESCRIPTION OF THE PREFERERED EMBODIMENT

Figure 1:
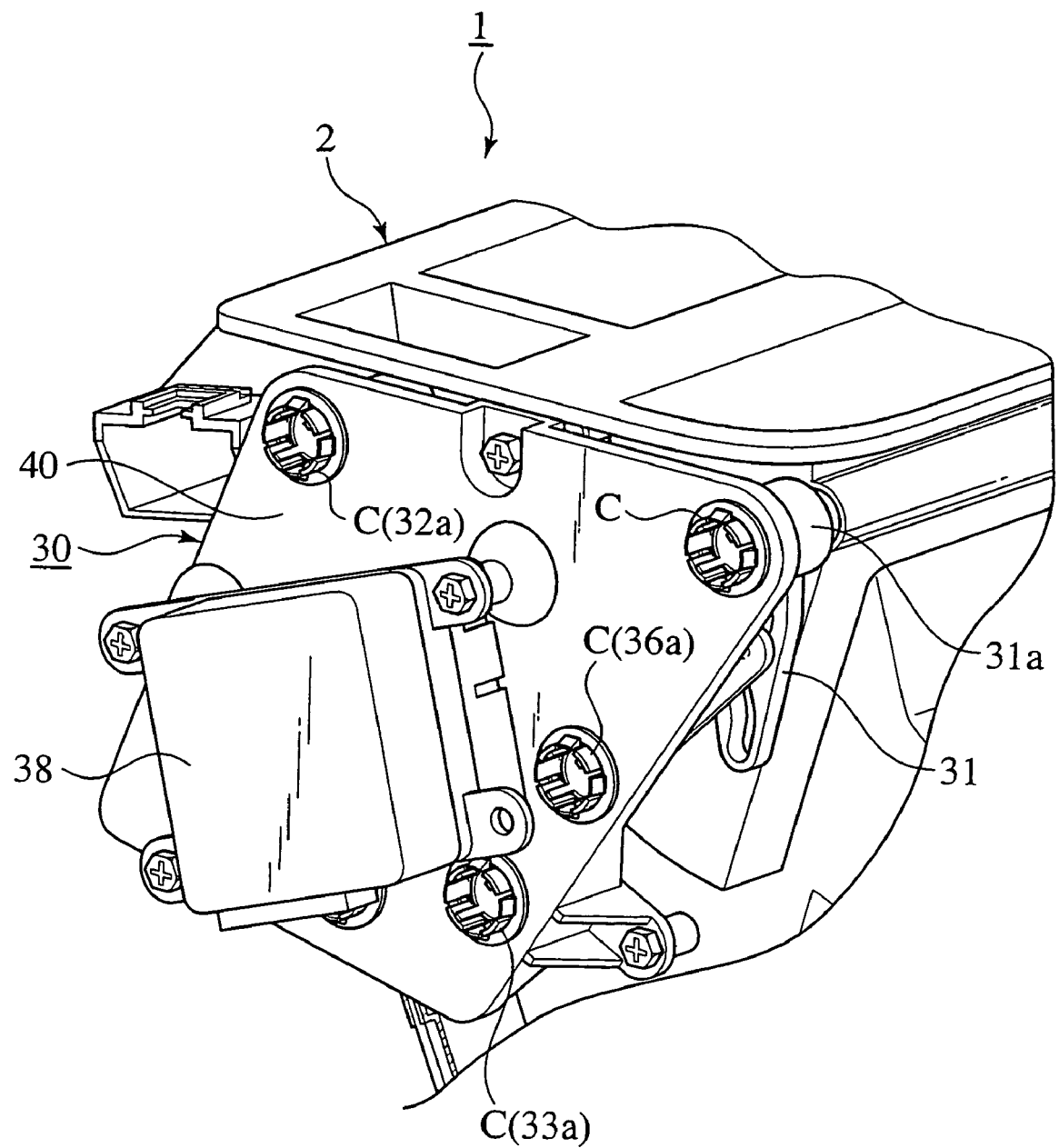
FIG. 1 is a perspective view of an essential assembly-structural part of a vehicle air-conditioning unit according to an embodiment of the present invention.

A preferred embodiment of the present invention will be described below with reference to the drawings.

[Structure of Air-conditioning Unit]

A vehicle air-conditioning unit 1 in this embodiment is installed within an instrument panel at the front of a passenger compartment of a vehicle. The vehicle air-conditioning unit 1 has a unit case 2 in which an air passage is formed. A scroll chamber in which a sirocco fan as an air blower is housed is formed upstream of the air passage. The air passage is formed along both sidewalls of the unit case 2.

A cooling heat exchanger for cooling an air flow and a heating heat exchanger for heating an air flow passing through the cooling heat exchanger are disposed in the air passage. Downstream of the cooling heat exchanger, the air passage forks into a warm air passage through which air passing through the cooling heat exchanger flows toward the heating heat exchanger, and a bypass passage through which air passing through the cooling heat exchanger directly flows, bypassing the heating heat exchanger. An air mixing door for controlling the air distribution ratio between the warm air passage and the bypass passage is disposed downstream of the cooling heat exchanger and upstream of the heating heat exchanger. The confluence of the warm air passage and the bypass passage is formed as an air mixing chamber in which warm air and cool air are mixed. In the air mixing chamber, air is conditioned to a given temperature. A face outlet, a defroster outlet and a foot outlet, through which air is discharged out from the unit case 2, are provided downstream of the air mixing chamber.

Also, a plurality of doors (four in this embodiment) for selectively opening and closing the face outlet, defroster outlet and foot outlet are disposed in the air passage.

A first mode door (face door) controls the amount of air flowing out through the face outlet. The first mode door is provided at the inlet of a face outlet passage communicating with the face outlet, and rotates between an open position (face position) to open the face outlet and a closed position to close the face outlet.

A second mode door (defroster door) controls the amount of air flowing out through the defroster outlet. The second mode door is provided at the inlet of a defroster outlet passage communicating with the defroster outlet, and rotates between an open position (defroster position) to open the defroster outlet and a closed position to close the defroster outlet.

A third mode door (foot door) controls the amount of air flowing out through the foot outlet (not shown). The third mode door is provided at the inlet of a foot outlet passage, and rotates between an open position (foot position) to open the foot outlet and a closed position to close the foot outlet.

A fourth mode door (combined mode door) is provided at a position to be able to open and close the shortest flow path from the bypass passage to the face outlet and the shortest flow path from the warm air passage to the foot outlet, and rotates between an open position to open the shortest flow paths and a closed position to close the shortest flow paths. During full cooling, the fourth mode door is set at a position to allow cool air to flow the shortest distance from the bypass passage to the face outlet, and during air mixing, is set at a position to lengthen the path of air from the warm air passage and the bypass passage to a selected outlet.

Figure 2:
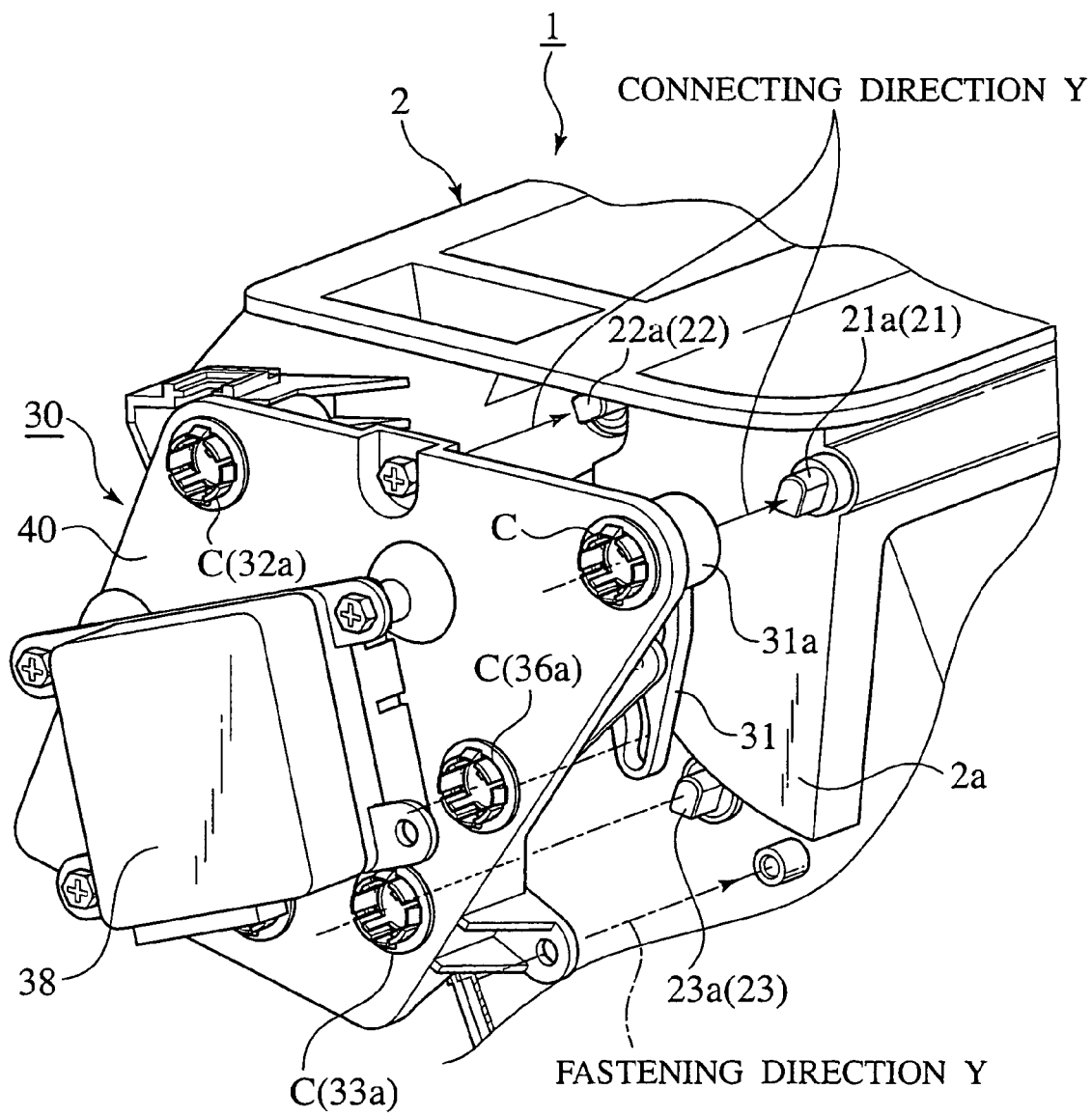
FIG. 2 is a perspective view of the essential part of the vehicle air-conditioning unit before a link module is mounted.
Figure 3:
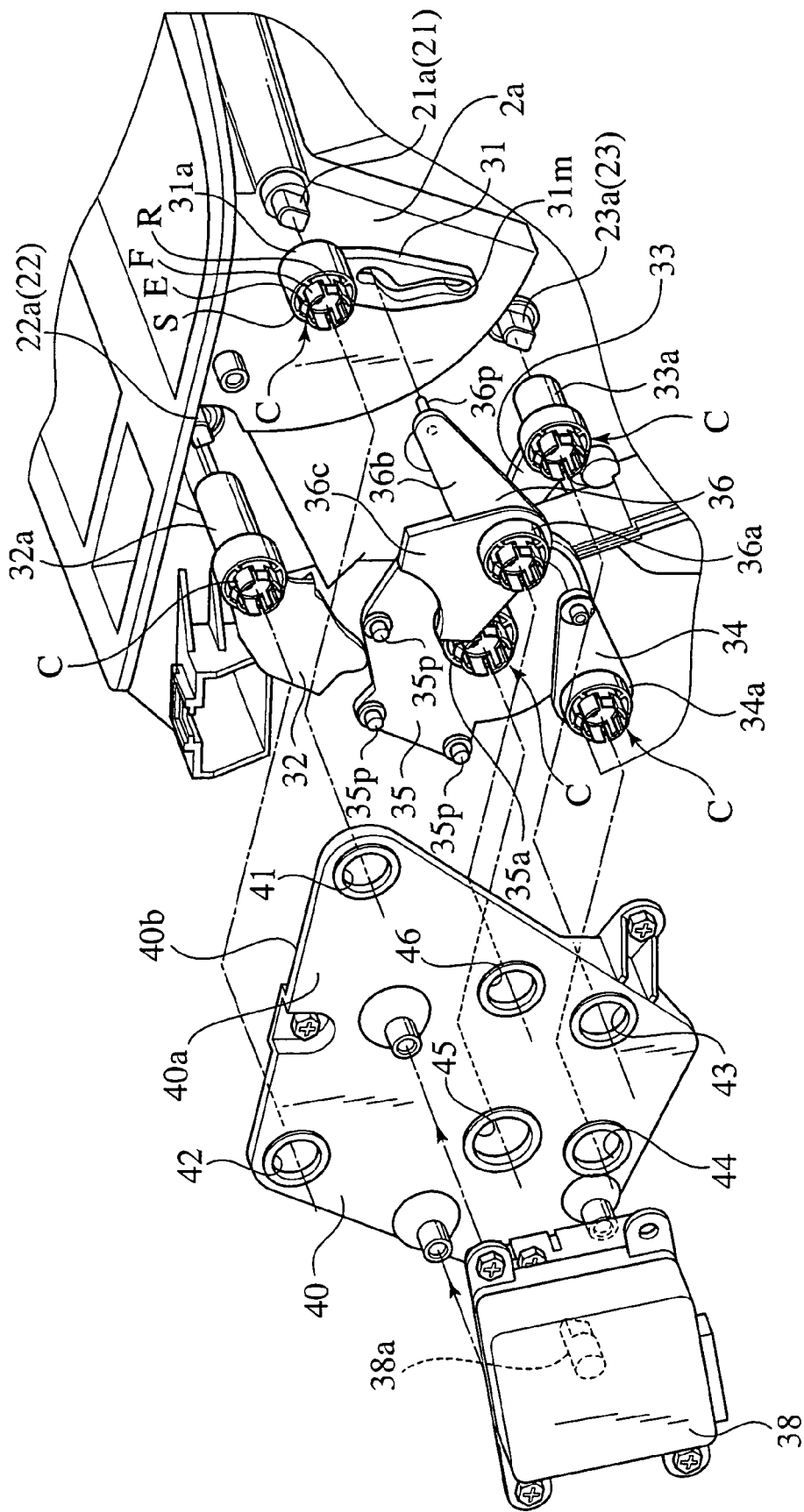
FIG. 3 is an exploded perspective view of the link module, showing mounting positions.
Figure 4:
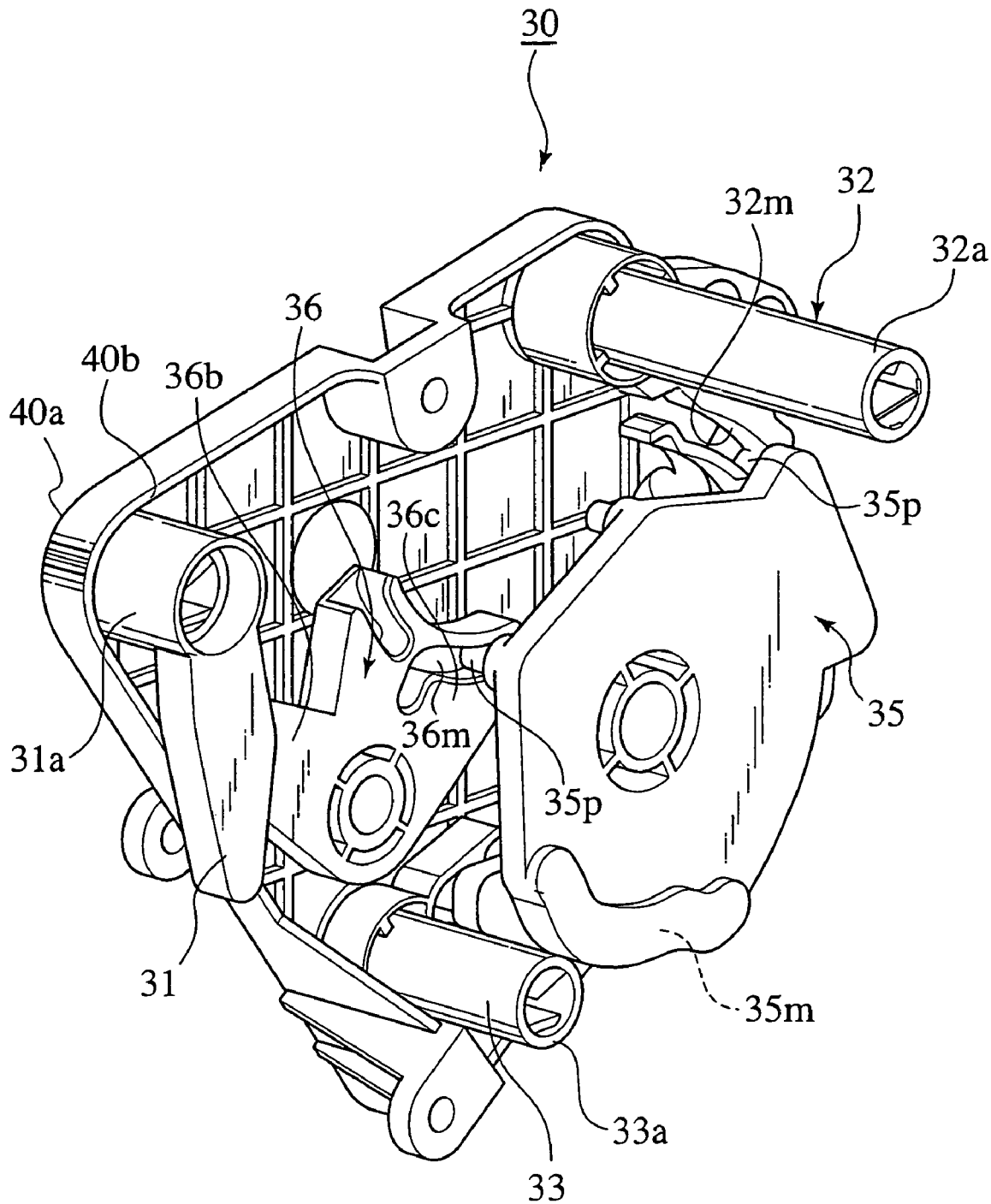
FIG. 4 is a perspective view of the link module at another angle.
Figure 5:
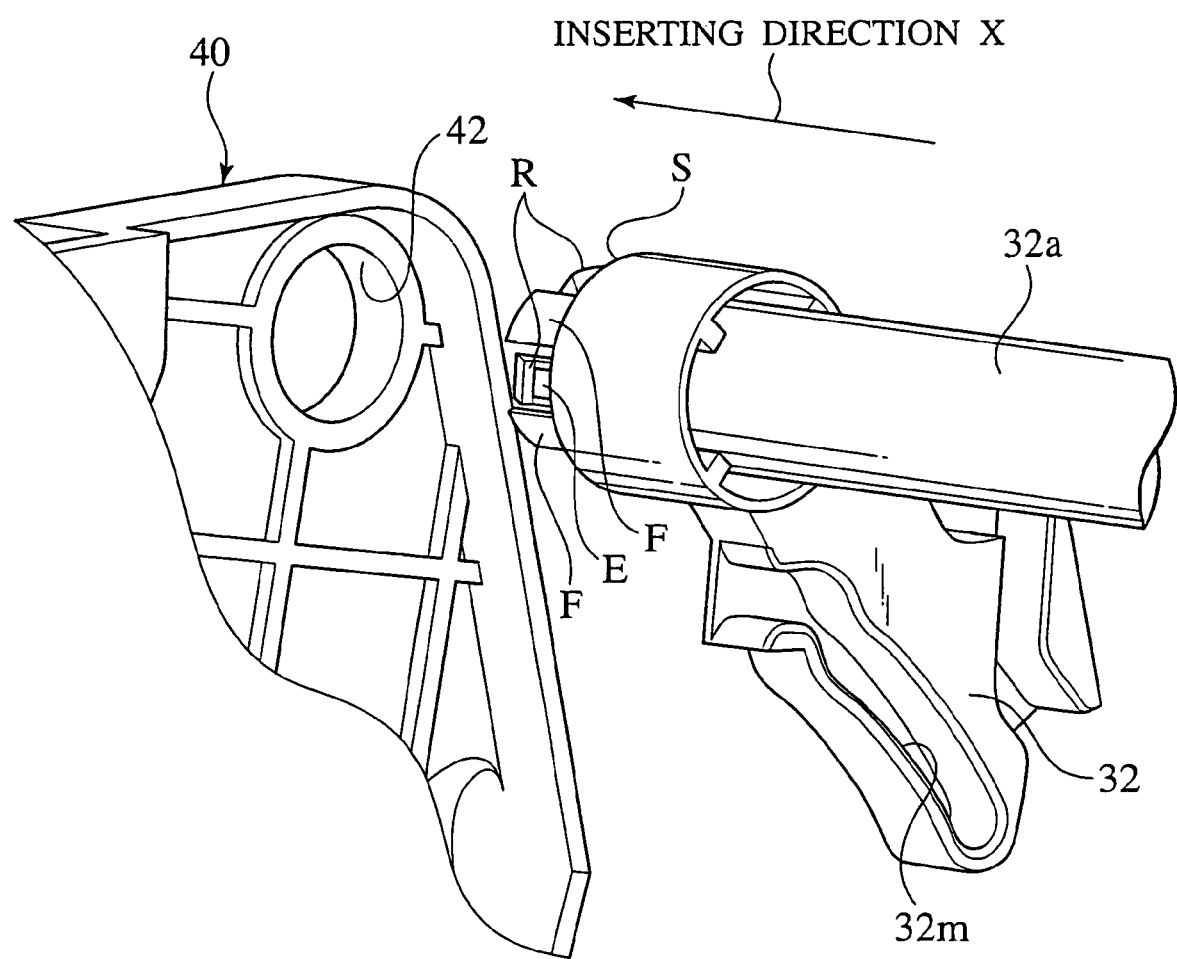
FIG. 5 is an exploded perspective view illustrating the fitting of an lever to a base.
Figure 7A:
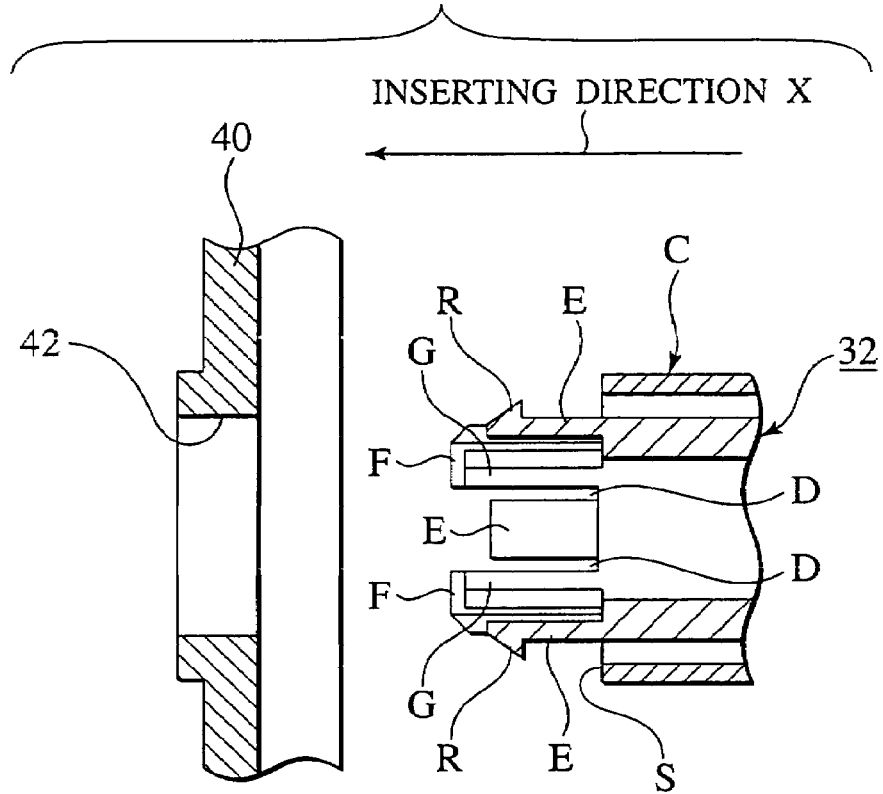
FIGS. 7A and 7B are cross-sectional views illustrating the fitting of the lever to the base, FIG. 7A showing the lever before fitting, FIG. 7B showing the lever fitted.
Figure 7B:
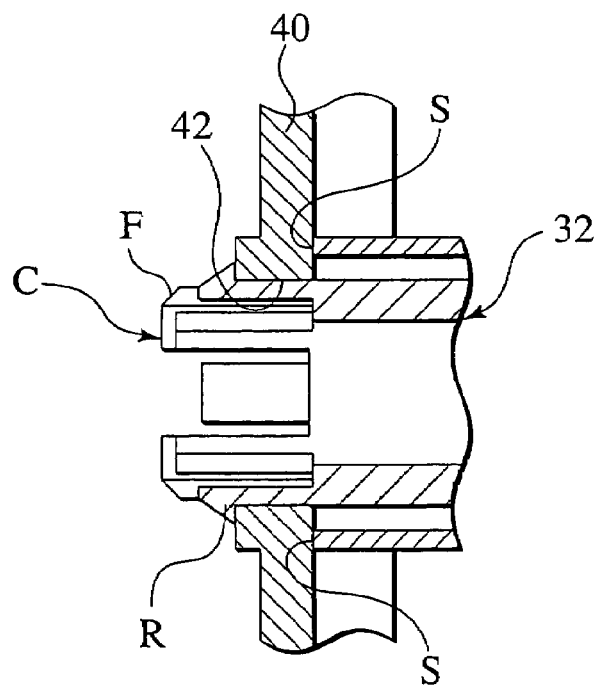
Figure 8B:
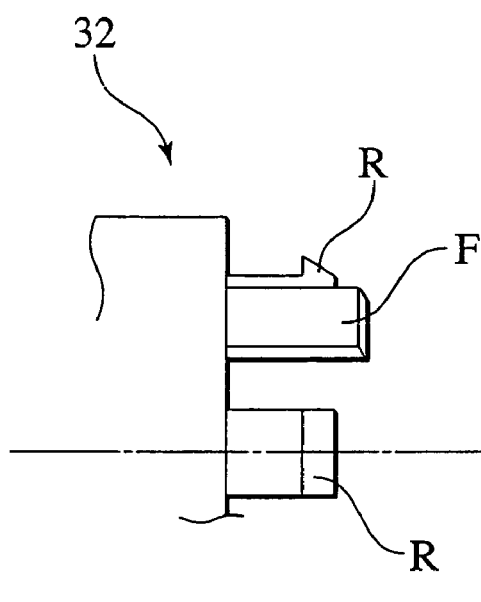
FIG. 8B is a side view thereof.
Figure 8A:
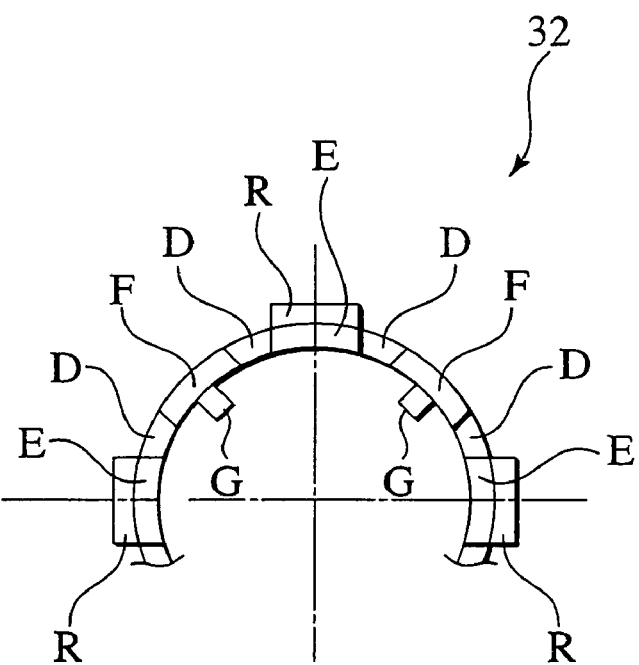
FIG. 8A is a front view of an end of the lever taken in a direction of arrow A in FIG. 6.
Figure 9A:
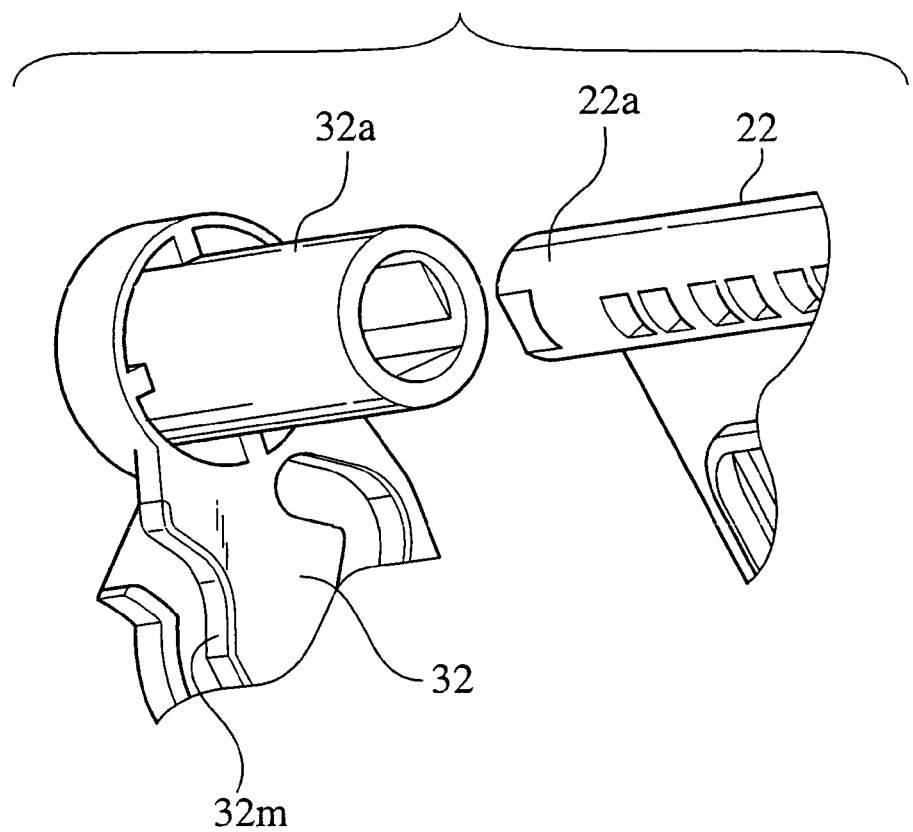
FIG. 9A is a perspective view of a fitting hole of the lever into which a rotary door shaft is fitted.
Figure 9B:
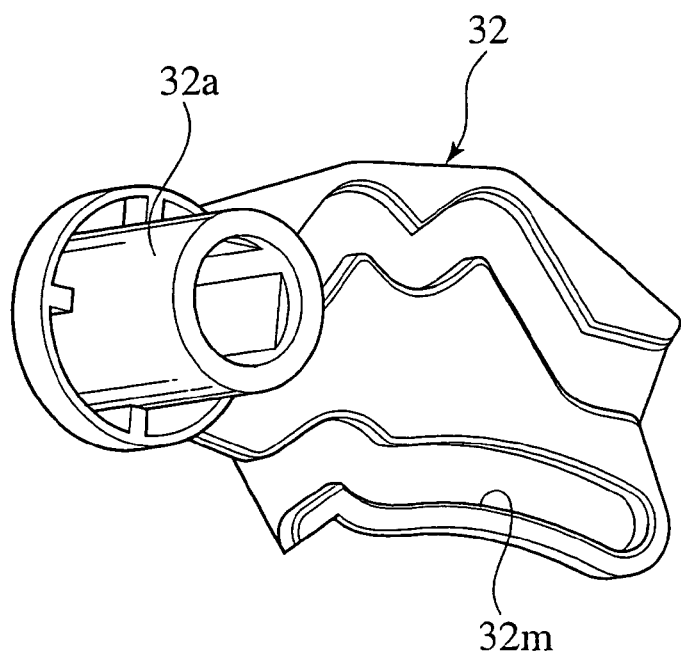
FIG. 9B is a perspective view at an angle different from that in FIG. 9A.
Figure 10:
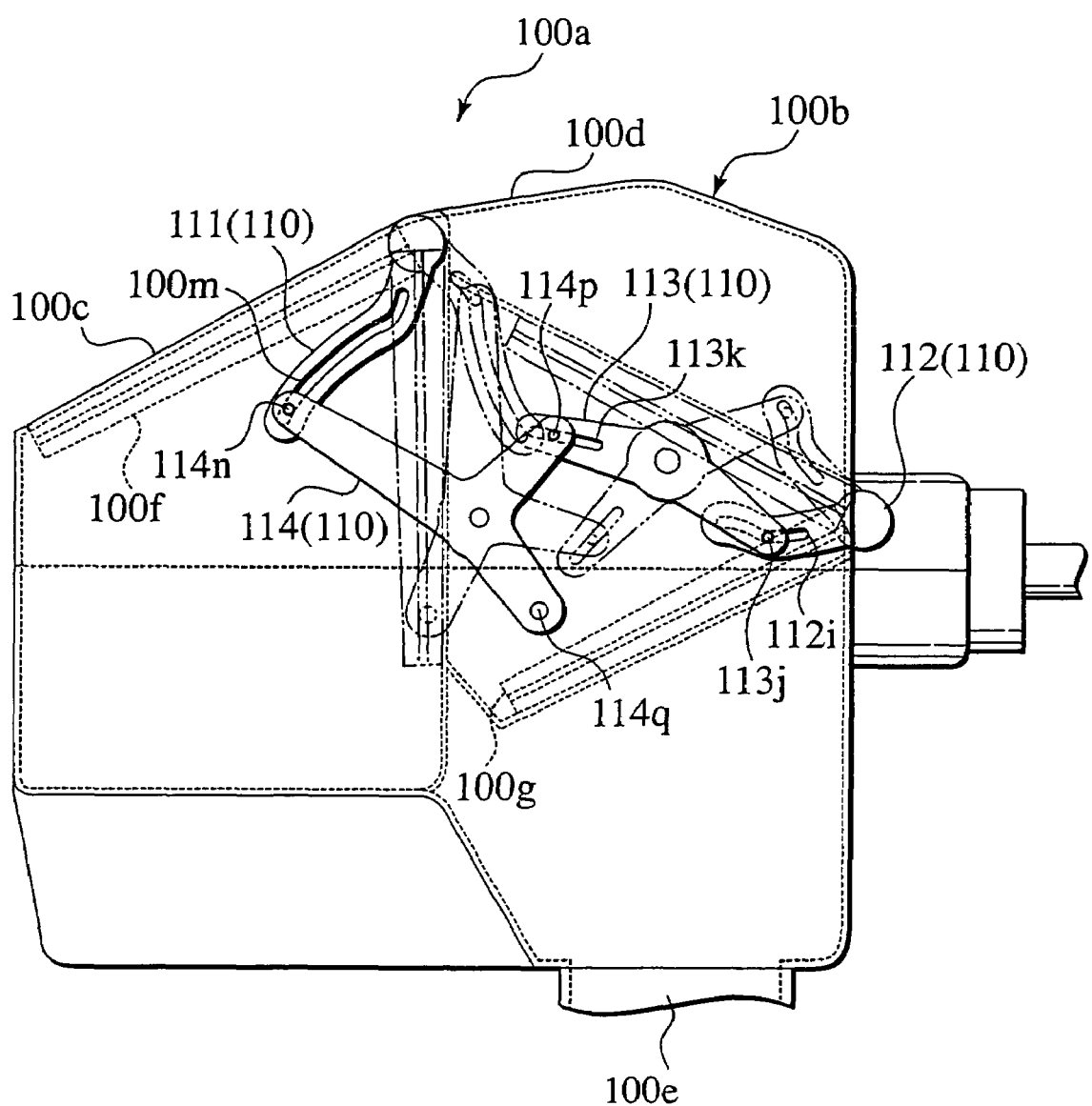
FIG. 10 is a diagram illustrating an exemplary conventional vehicle air-conditioning unit.

These mode doors are provided with rotary shafts 21 to 24 (the rotary shaft 24 of the fourth mode door is not shown in the figures but will be indicated with its reference numeral in the description) rotatably supported in bearings formed at both of the sidewalls of the unit case 2. As shown in FIGS. 2 and 3, the rotary shafts 21 to 24 of the mode doors have ends 21a to 24a, respectively, exposed at a first sidewall 2a. Levers 31 to 34 of a link mechanism 30 to be described below are connected to the exposed ends 21a to 24a, so that the four mode doors open and close in conjunction with one another.

A link mechanism of the present invention will be described below.

[Link Mechanism]

The link mechanism 30 includes the four levers 31 to 34, a plate base 40, a rotary link plate 35 as a "main link," and an intermediate link 36 a "sub-link."

[Levers]

The levers 31 to 34 are fixed to the rotary shafts 21 to 24 of the mode doors to rotate together with the doors. In this embodiment, of the four levers 31 to 34, the first lever 31 is connected to the rotary shaft 21 of the first mode door (vent door) the second lever 32 is connected to the rotary shaft 22 of the second mode door (defroster door), the third lever 33 is connected to the rotary shaft 23 of the third mode door (foot door), and the fourth lever 34 is connected to the rotary shaft 24 of the fourth mode door (combined mode door). The levers 31 to 34 are provided with rotary shafts 31a to 34a, respectively, disposed coaxially with the rotary door shafts 21 to 24 and connected to the ends 21a to 24a of the rotary door shafts 21 to 24. The rotary shafts 31a to 34a of the levers 31 to 34 are rotatably supported on the base 40, to be described below, to form a shaft-runout prevention structure.

[Base]

The base 40 is formed in a plate. The base 40 is attached to the unit case 2 by an appropriate attachment device. The base 40 includes bearing holes 41 to 44 as bearings for rotatably supporting the rotary shafts 31a to 34a of the levers 31 to 34. The base 40 also includes a bearing hole 45 as a bearing for rotatably supporting a rotary shaft 35a of the rotary link plate 35 as a "main link", to be described below, and a bearing hole 46 as a bearing for rotatably supporting a rotary shaft 36a of the intermediate link 36 as a "sub-link", to be described below as well.

A drive motor 38 as a driving means is mounted to a first surface 40a of the base 40 (surface on the opposite side to the unit case side). Mounted to a second surface 40b of the base 40 (surface on the unit case side) are the levers 31 to 34, the rotary link plate 35 and the intermediate link 36, which constitute the link mechanism 30. That is, the levers 31 to 34, rotary link plate 35 and intermediate link 36 constituting the link mechanism 30 are disposed between the base 40 and the unit case 2. The components 31 to 36 of the link mechanism 30 are thus covered by the base 40. With this, the components 31 to 36 can be protected, resulting in a reduced possibility of damage to the link mechanism 30.

[Main Link]

The rotary link plate 35 as a "main link" includes the rotary shaft 35 rotatably supported in the bearing hole 45 of the base 40 as described above. The rotary shaft 35a of the rotary link plate 35 is positioned coaxially with an output shaft 38a of the drive motor 38, and has its distal end portion located on the first surface 40a side of the base 40 and connected to the output shaft 38a of the drive motor 38. With this, the rotary link plate 35 rotates with the rotary shaft 35a as the pivot, in response to the output of the drive motor 38.

The rotary link plate 35 is formed with engaging grooves or engaging pins to engage with engaging pins or engaging grooves formed on the levers 31 to 34. In this embodiment, the first to third levers 31 to 33 are formed with engaging grooves 31m to 33m, and the fourth lever 34 is formed with an engaging pin 34p. Correspondingly, the rotary link plate 35 is formed with a plurality of engaging pins 35p to engage with the engaging grooves 31m to 33m of the first to third levers 31 to 33 and also formed with an engaging groove 35m to engage with the engaging pin 34p of the fourth lever 34.

The engaging groove 31m of the first lever 31 engages with the engaging pin 35p of the rotary link plate 35 via the intermediate link 36 to be described below, and thus rotates the first lever 31 in a direction opposite to that of the second to fourth levers 32 to 34.

[Sub-Link]

The intermediate link 36 as a "sub-link" engages with the rotary link plate 35 and the first lever 31 to rotate the first lever 31 in a direction opposite to that of the other levers 32 to 34 as described above. A first arm 36b and a second arm 36c protrude from the rotary shaft 36a of the intermediate link 36. The first arm 36b is provided with an engaging pin 36p to engage with the engaging groove 31m of the first lever 31, and the second arm 36c is provided with an engaging groove 36m to engage with the engaging pin 35p of the rotary link plate 35.

[Operation of the Link Mechanism]

In the above-described structure of the link mechanism 30, when the rotary link plate 35 is rotated by the drive motor 38, the four levers 31 to 34 rotate in conjunction with one another via the intermediate link 36 or directly rotate. Accordingly, the four mode doors rotate in conjunction with one another.

[Assembly Structure of Air-conditioning Unit]

[Link Module]

In the assembly structure of the vehicle air-conditioning unit 1 as described above, first, as shown in FIG. 2, the base 40, the levers 31 to 34, the rotary link plate 35 and the intermediate link 36, which constitute the link mechanism 30, are preassembled into a link module 30. The link module 30 is then attached to the unit case 2. In this embodiment, the link module 30 is integrally attached to the unit case 2 with the drive motor 38 also attached to the first surface 40a of the base 40 of the link module 30.

The base 40 of the link module 30 serves as a module base plate of the link module 30, rotatably supporting the rotary shafts 31a to 36a of the levers 31 to 34, rotary link plate 35 and intermediate link plate 36 in the bearing holes 41 to 46 of the base 40.

In this embodiment, in order to improve the assembly of the link module 30, once the rotary shafts 31a to 36a of the levers 31 to 34, rotary link plate 35 and intermediate link plate 36 are connected to the base 40, they are prevented from being disengaged. Specifically, locking claws R and a stopper S are provided at an inserted distal end portion C, in this order from the inserted end side, of each of the rotary shafts 31a to 36a of the levers 31 to 34, rotary link plate 35 and intermediate link plate 36.

[Stopper and Locking Claws]

FIGS. 5 to 8 only illustrate a bearing structure of the rotary shaft 32a of the second lever 32. The rotary shafts of the other levers 31, 33, 34, rotary link plate 35 and intermediate link 36 each also have a bearing structure with a stopper S and locking claws R, and are not shown in detail in the figures.

As shown in FIGS. 5 to 8, when the rotary shafts 31a to 36a are inserted into the bearing holes 41 to 46 of the base 40, the stoppers S abut the rims of the bearing holes 41 to 46, stopping the rotary shafts 31a to 36a at their respective mounting positions to the base 40. The locking claws R permit the rotary shafts 31a to 36a to be inserted into the bearing holes 41 to 46 of the base 40, and prevent the movement of the rotary shafts 31a to 36a from their mounting positions to the base 40 in a direction opposite to an inserting direction X. The positioning functions of the stoppers S and the locking claws R as positioning means allow the levers 31 to 34, the rotary link plate 35 and the intermediate link 36 to be attached to the base 40 with a single motion of only inserting the rotary shafts 31a to 36a of the levers 31 to 34, rotary link plate 35 and intermediate link 36 into the bearing holes 41 to 46 of the base 40. This facilitates the assembly of the link module 30. When mounting the link module 30 to the unit case 2, the assembled components 31 to 36 are prevented from disengaging from the base 40 by the positioning functions of the stoppers S and the locking claws R, resulting in improved assembly operations of the link module 30 to the unit case 2.

The inserted distal end portions C of the rotary shafts 31a to 36a are each formed in a hollow cylindrical shape and provided with slits D extending axially from the inserted distal end. Specifically, the inserted distal end portions C of the rotary shafts 31a to 36a each include, alternately with the slits D, a plurality of flexible portions E, F that are flexible in radial directions of the rotary shafts 31a to 36a. The locking claws R are formed at the flexible portions E, respectively. When inserting the rotary shafts 31a to 36a into the bearing holes 41 to 46, a reduced inserting force is required due to the flexibility of the distal end portions C. The assembly operation of the link module 30 is thus further improved. In this embodiment, each of the inserted distal end portions C is divided into eight portions, alternately provided with the flexible portions E with the locking claws R at their respective outer peripheries as described. The flexible portions F are formed at their respective inner peripheries with ribs G so as not to be easily bent, which ensures the rigidity of the inserted distal end portion C.

With the base 40 fastened to the unit case 2, the engagement between the rims of the bearing holes 41 to 44 of the base 40 and the stoppers S of the rotary shafts 31a to 34a of the levers 31 to 34 prevents the rotary shafts 31a to 34a of the levers 31 to 34 from moving in a direction opposite to an inserting direction Y toward the exposed ends 21a to 24a of the rotary door shafts 21 to 24. Thus, the levers 31 to 34 can be prevented from disengaging from the rotary door shafts 21 to 24. The forces for fastening the base 40 to the unit case 2 are opposed to reaction forces for the connection of the rotary lever shafts 31a to 34a to the rotary door shafts 21 to 24, so that the connection between the rotary lever shafts 31a to 34a and the rotary door shafts 21 to 24 is reliably maintained.

The above-described structure in this embodiment provides a structure and operation as will be described below.

First, in this structure, since the levers 31 to 34, the rotary link plate 35 and the intermediate link 36 are disposed between the base 40 and the unit case 2, the components of the link mechanism 30 are covered by the base 40. The components of the link mechanism 30 can thus be protected, resulting in a reduced possibility of damage to the link mechanism 30. Although the rotary link plate 35 is used as a main link, a sliding main link can alternatively be used as a main link, providing the same effects.

Second, in this structure, with the base 40 fastened to the unit case 2, the base 40 engages with the levers 31 to 34, preventing the movement of the rotary lever shafts 31a to 34a in a direction opposite to a connection direction to the rotary door shafts 21 to 24, so that the levers 31 to 34 can be reliably prevented from disengaging from the rotary door shafts 21 to 24.

Third, in this structure, a fastening direction Y of the base 40 to the unit case 2 is the same as a connecting direction Y of the rotary lever shafts 31a to 34a to the rotary door shafts 21 to 24 so that the forces of fastening the base 40 to the unit case 2 oppose the connecting-reaction forces from the rotary door shafts 21 to 24 to the rotary lever shafts 31a to 34a, thereby reliably maintaining the connection between the rotary lever shafts 31a to 34a and the rotary door shafts 21 to 24.

Fourth, in this assembly structure, after the levers 31 to 34, the rotary link plate 35, the intermediate link 36 and the base 40, which constitute the link mechanism 30, are preassembled into the link module 30, the link module 30 is attached to the unit case 2. This arrangement increases the efficiency of mounting the link mechanism 30 to the unit case 2. As a result, the assembly of the air-conditioning unit 1 is improved, resulting in reduced production costs.

Fifth, in this structure, the base 40 is provided with the bearing holes 41 to 46 for rotatably supporting the rotary shafts 31a to 36a of the levers 31 to 34, rotary link plate 35 and intermediate link 36, serving as a module base plate of the link mechanism 30. This can eliminate the need for using additional connecting members or the like to modularize the link mechanism 30, reducing the number of required components, and further reducing the production costs of the air-conditioning unit 1.

Although, in the structure of this embodiment, the levers 31 to 34, the rotary link plate 35 and the intermediate link 36 are provided with the rotary shafts 31a to 36a, respectively, and the base 40 is provided with the bearing holes 41 to 44, the present invention is not limited thereto. Alternatively, it is also possible to provide bearing holes in the levers 31 to 34, the rotary link plate 35, and/or the intermediate link 36 and to provide rotary shafts constituting the pivots at the base 40.

Sixth, in this structure, the rotary shafts 31a to 34a of the levers 31 to 34 are each provided with the locking claws R and the stopper S for positioning the levers 31 to 34 at the predetermined mounting positions. This arrangement permits the levers 31 to 34 to be attached to the base 40 with a single motion of only inserting the rotary shafts 31a to 34a of the levers 31 to 34 into the bearing holes 41 to 44 of the base 40, resulting in improved assembly of the link module 30. The same is true for the rotary link plate 35 and the intermediate link 36.

Seventh, in this structure, the inserted distal end portions C of the rotary shafts 31a to 34a of the levers 31 to 34 are each provided with the flexible portions E and F which can bend inwardly, and the locking claws R are formed at the flexible portions E. This arrangement permits the force of inserting the rotary shafts 31a to 34a into the bearing holes 41 to 44 can be reduced, resulting in improved assembly of the link module 30. The same is true for the rotary link plate 35 and the intermediate link 36.

Eighth, in this structure, the drive motor 38 is fixed to the base 40 of the link module 30, which eliminates the need for a bracket which has conventionally been required for fixing the drive motor 38 to the unit case 2. The number of components is thus reduced, and also the number of assembly steps is reduced, resulting in further reduced production costs.

Ninth, in the assembly structure, the link module 30 to which the drive motor 38 is pre-assembled and attached to the unit case 2, which results in a further improved assembly efficiency of the air-conditioning unit 1.

In this embodiment, since the link mechanism 30 includes the intermediate link 36 in addition to the levers 31 to 34 and the rotary link plate 35, at least the lever 31 can be rotated opposite to the other levers 32 to 34. This arrangement provides design freedom of opening and closing patterns of the doors is increased.

Although the present invention has been described in detail above with the embodiment, it is clear to those skilled in the art that the present invention is not limited to the embodiment described in the specification. The apparatus of the invention can be implemented in alterations and modifications without departing from the spirit and scope of the invention as defined by the description of the appended claims. Therefore, the description of the invention is only for illustrative purposes and is not meant to limit the invention.

What is claimed is:

1. A vehicle air-conditioning unit, comprising:
  a unit case defining an air passage;
  a plurality of doors for opening and closing the air passage; and
  a link mechanism,
  the link mechanism comprising:
    levers connected to rotary shafts of the doors, respectively, to rotate the rotary door shafts;
    a plate shaped base fixed to the unit case and formed with a support; and
    a main link pivotably or slidably supported by the support of the base and engaged with the levers, for rotating the levers,
    wherein the levers and the main link are disposed between the base and the unit case such that the base covers at least the rotary door shafts and the main link.

2. The vehicle air-conditioning unit as set forth in claim 1, wherein:
  the rotary door shafts have ends extending from the unit case, respectively;
  the levers are provided with rotary lever shafts, respectively, coaxially with the rotary door shafts and connected to the ends of the rotary door shafts, respectively; and
  the base is engageable with the levers to prevent the rotary lever shafts from moving in a direction opposite a direction to which the rotary door shafts are connected to the rotary lever shafts.

3. The vehicle air-conditioning unit as set forth in claim 2, wherein:
  the base and the unit case are disposed so that a force for connecting the base to the unit case is opposed by a reaction force to the connection of the rotary lever shafts to the rotary door shafts.

4. An assembly structure of a vehicle air-conditioning unit, comprising:
  a plurality of doors for opening and closing an air passage within a unit case of the air-conditioning unit; and
  a link module;
  the link module comprising:
    levers attached to rotary shafts of the doors, respectively, to rotate the rotary door shafts;
    a plate shaped base fixed to the unit case and formed with a support; and
    a rotary link plate rotatably supported by the support of the base to be rotated by a drive device, so as to rotate the levers;
    wherein the levers, the rotary link plate and the base are assembled into the link module, the link module being mounted to the unit case, and
    wherein the levers and the rotary link plate are disposed between the base and the unit case such that the base covers at least the rotary door shafts and the rotary link plate.

5. The assembly structure of a vehicle air-conditioning unit as set forth in claim 4, wherein:
the levers and the rotary link plate are provided with one of rotary shafts and bearing holes, respectively, and the base is provided with one of bearing holes and rotary shafts, respectively; and
the rotary shafts are rotatably supported in the corresponding bearing holes, thereby mounting the levers and the rotary link plate to the base.

6. The assembly structure of a vehicle air-conditioning unit as set forth in claim 4, wherein:
the levers and the rotary link plate are provided with rotary shafts, respectively;
the base is provided with bearing holes for rotatably supporting the rotary shafts, respectively; and
the rotary shafts are rotatably supported in the corresponding bearing holes, thereby mounting the levers and the rotary link plate to the base.

7. The assembly structure of a vehicle air-conditioning unit as set forth in claim 4, wherein:
the base is provided with rotary shafts constituting pivots of the levers and the rotary link plate, respectively;
the levers and the rotary link plate are provided with bearing holes for rotatably supporting the rotary shafts, respectively; and
the rotary shafts are rotatably supported in the corresponding bearing holes, thereby mounting the levers and the rotary link plate to the base.

8. The assembly structure of a vehicle air-conditioning unit as set forth in claim 5, wherein:
the rotary shafts constituting the pivots of the levers are each provided with locking claws to stop the rotary shafts at mounting positions when the rotary shafts are inserted into the bearing holes and a stopper to prevent the rotary shafts from moving from the mounting positions in a direction opposite to an inserting direction.

9. The assembly structure of a vehicle air-conditioning unit as set forth in claim 8, wherein:
the rotary shafts constituting the pivots of the levers each have an inserted distal end portion in a hollow cylindrical shape including slits formed axially from an inserted distal end, and flexible portions provided alternately with the slits; and
the locking claws are formed at the flexible portions, respectively.

10. The assembly structure of a vehicle air-conditioning unit as set forth in claim 5, wherein:
the rotary shaft constituting the pivot of the rotary link plate is provided with a stopper to stop the rotary shaft at a mounting position when the rotary shaft is inserted into the bearing hole and locking claws to prevent the rotary shaft from moving from the mounting position in a direction opposite to an insertion direction.

11. The assembly structure of a vehicle air-conditioning unit as set forth in claim 10, wherein:
the rotary shafts constituting the pivot of the rotary link plate has an inserted distal end portion formed in a hollow cylindrical shape including slits formed axially from an inserted distal end, and flexible portions provided alternately with the slits; and
the locking claws are formed at the flexible portions, respectively.

12. The assembly structure of a vehicle air-conditioning unit as set forth in claim 4, wherein the drive device is mounted to the base.

13. The assembly structure of a vehicle air-conditioning unit as set forth in claim 12, wherein the drive device is attached to the base of the link module before the link module is attached to the unit case.

14. The assembly structure of a vehicle air-conditioning unit as set forth in claim 4, wherein:
the link module further comprises an intermediate link; and
at least one of the levers is coupled to the rotary link plate via the intermediate link to rotate in a direction opposite to the other levers.

15. A link module for interlocking a plurality of doors for opening and closing an air passage within a unit case of a vehicle air-conditioning unit, the link module comprising:
levers attached to rotary shafts of the doors, respectively, to rotate the rotary shafts of the doors;
a plate shaped base fixed to the unit case and formed with a support; and
a rotary link plate rotatably supported by the support of the drive device, so as to rotate the levers simultaneously;
wherein the levers, the rotary link plate and the base are assembled into the link module, the link module configured to be mounted to the unit case, and
wherein the levers and the rotary link plate are disposed between the base and the unit case such that the base covers at least the rotary door shafts and the rotary link plate.

16. The vehicle air-conditioning unit as set forth in claim 1, wherein the base covers at least the rotary door shafts and the main link along an axial direction of the rotary door shafts.

17. The vehicle air-conditioning unit as set forth in claim 1, wherein the base substantially covers the rotary door shafts, the levers, and the main link along an axial direction of the rotary door shafts.

18. The vehicle air-conditioning unit as set forth in claim 1, wherein the support is bearing a hole, the main link includes a rotary shaft and the rotary shaft is supported by the bearing hole.

* * * * *